Patented Feb. 20, 1940

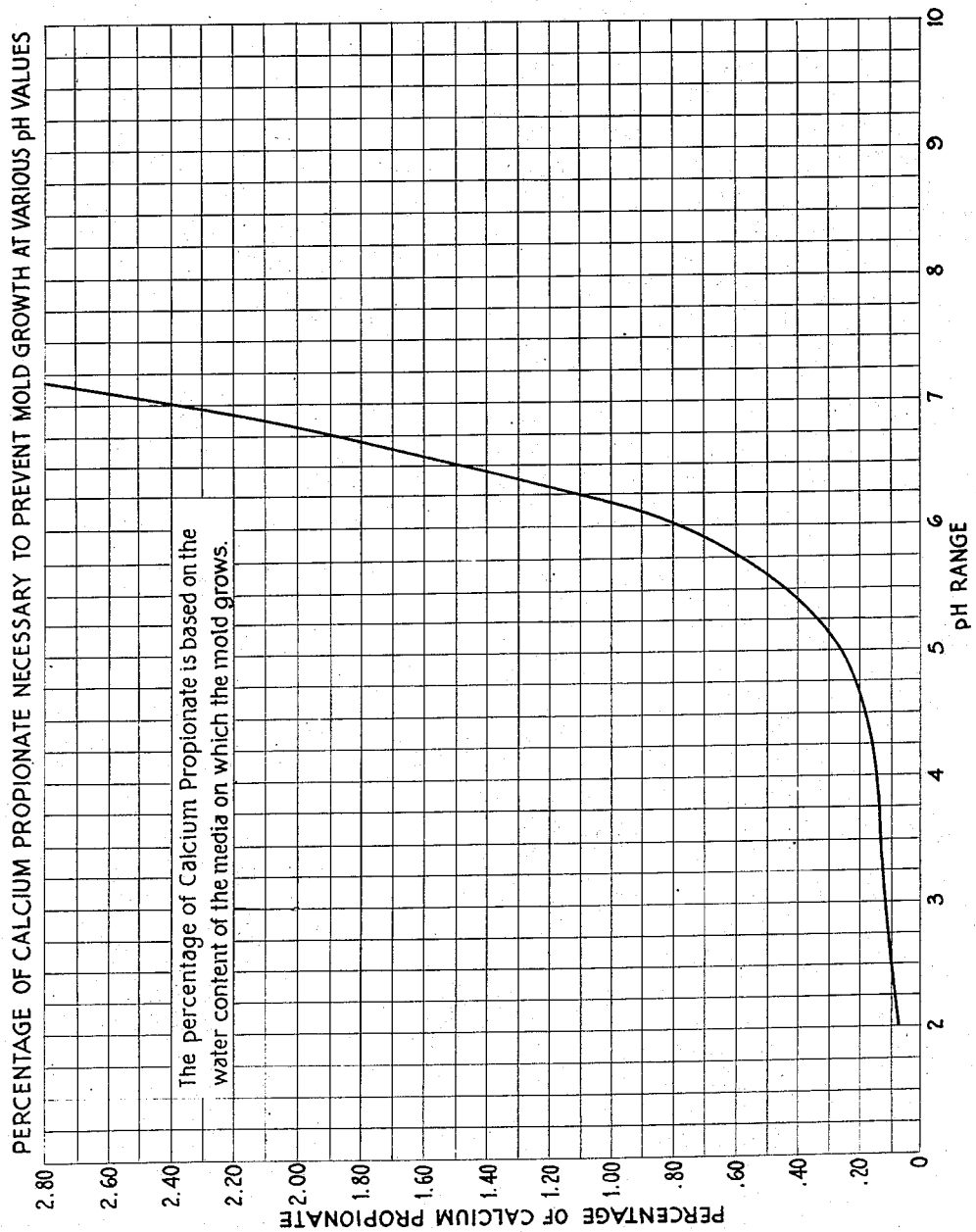

2,190,714

UNITED STATES PATENT OFFICE 2,190,714

PROCESS FOR INHIBITION OF MOLD

Charles Hoffman, Scarsdale, Gaston Dalby, New York, and Thomas R. Schweitzer, South Ozone Park, N. Y., assignors to Ward Baking Company, New York, N. Y., a corporation of New York Application December 1, 1936, Serial No. 113,552

3 Claims. (Cl. 99—224)

This invention relates to materials susceptible to mold growth and more particularly to the inhibition or prevention of mold growth in materials susceptible thereto.

As is well known, foodstuffs such as bread, pastries, various cereal products, milk products such as butter and cheese, meats, wines, and in fact a multitude of products of animal or vegetable origin are susceptible in varying degrees to the growth of mold therein or thereupon which renders such materials unfit for human consumption.

Mold formation is caused by a species of microorganism which feeds upon a wide variety of different materials occurring in a natural or manufactured condition. The micro-organisms grow and propagate rapidly under favorable conditions of humidity and temperature and, under unfavorable conditions such as insufficient moisture, they form highly resistant spores which readily become dispersed and scattered and immediately start a mold growth when humidity and other conditions are favorable.

Bread, for example, being moist and porous makes an excellent medium for the growth of mold. Almost all of the common molds, Aspergillus niger, Penicillium glaucus, Penicillium expansum, Rhizopus nigricans, Trichothecium roseum, various species of Mucor, etc., under the favorable conditions existing in undried bread grow rapidly on the surface of the loaf and between the slices if the bread be sliced. The wrapping of the bread and slicing it before wrapping have made the problem of molds more serious since the moisture-proof wrapper retains and holds the moistness of the loaf. As these molds render the bread unfit and possibly dangerous for the consumer, the molding of the bread even after being wrapped and sold is a constant source of expense and annoyance. Similar difficulties also occur in other goods such as cereal products, sweet butter, icings and other products of animal or vegetable origin.

Owing to the wide diffusion of the mold spores it is substantially impossible to prevent their access to food products stored or processed under commercial conditions. As a result, mold formation rapidly sets in after such food products have been exposed to the air either during processing or storage and when subjected to moisture and temperature conditions suitable for the growth of the mold.

Various methods have been proposed to overcome mold growth, such for example as packaging foodstuffs so as to maintain an atmosphere of inert gases surrounding the foodstuffs; preparing the foodstuff, such as bread, in an atmosphere purified of mold spores; treating the foodstuff with germicides, or the like. All such prior proposals have been characterized, however, by great expense or by adverse effect upon the flavor, odor, edibility or food value of the treated product and as a consequence have not been commercially feasible. The problem of mold prevention in a manner practically operable, has, therefore, persisted without practical solution up to the present invention.

It is an object of this invention to obviate the disadvantages of the prior art and to provide a new and improved method for inhibiting the growth of mold in materials susceptible thereto.

It is a further object of this invention to provide a method of preventing mold in foodstuffs without adverse effect upon the treated product.

Other objects and advantages of this invention will be apparent from the following specification.

According to the present invention the growth of mold in materials susceptible thereto is inhibited by the treatment of such materials with, or by the incorporation therein or addition thereto of, a relatively small quantity of one or more salts of a saturated branched or straight chain monocarboxylic aliphatic acid of from 3 to 12 carbon atoms. By these terms it is meant to include the salts of the various metals, especially the alkali and alkaline earth metals, as well as the ammonium, substituted ammonium and like salts of such 3 to 12 carbon atoms. In the case of any of these salts it will be understood that they may be utilized as such or in the form of substances which will in the presence of moisture be converted at least in part to the salt; such, for example, as in the case of amides which, in the presence of water, will yield the ammonium salt; or in the case of adding the acid together with, subsequent to, or followed by an alkali or alkaline compound, the alkaline material being present in sufficient amount to neutralize the acid.

The list of substances coming within the bounds of this invention could be extended greatly, but by citing the following specific materials which are useful as mold inhibitors according to this invention, the nature of the broader classifications will be made adequately clear. According to this invention, then, there may be utilized small quantities of such substances, or mixtures and equivalents thereof, as: sodium, calcium, potassium, magnesium, mercury, zinc, ammonium and like propionates, butyrates, isobutyrates, valerates, capryates, laurates, and the like. In the case of foodstuffs, although effective in inhibiting mold, the use of toxic or poisonous salts of the acids hereinbefore described, such as the zinc, mercury, barium and strontium salts, is, of course, avoided.

According to a further feature of this invention, improvement in the taste and quality of foodstuffs, mold inhibited as hereinbefore described, may be obtained, particularly in baked goods, by incorporation in the foodstuff of a small quantity of an alkaline compound such as sodium or ammonium carbonate, bicarbonate, carbamate, urea or the like, or mixtures of such materials. Thus, for example, in using a propionate salt, such as calcium propionate, a quantity of the alkaline compound, such as ammonium carbonate, or bicarbonate, equal to ⅛ the quantity of calcium propionate serves to improve greatly the quality of bread generally, as well as to improve the taste specifically. The quantities of alkaline material, such as ammonium carbonate or bicarbonate, used may be varied over a considerable range, such as from, say, 1/16 to ¼ of the quantity of inhibitor, altho a quantity approximately midway between these extremes is generally preferable, being based, as stated hereinbefore, upon the quantity of the inhibitor used.

The quantity of inhibitor, i. e. a salt of an acid, or mixture of the same, required to produce the optimum mold-inhibiting effect, is varied by, among other things, the specific pH value of the material treated. Generally speaking, however, an amount of salt equal to from about 0.01% to 2.3%, based upon the water content by weight of the material being treated, is preferred and sufficient to protect materials of pH 3 to 7 against mold formation. Smaller proportions may be utilized if lower pH values exist, and greater proportions if higher pH values, without departing from this invention. The variation of required concentration of salt with variation of pH value is shown in the accompanying drawing, utilizing calcium propionate as an example, wherein the abscissa give the pH range and the ordinates the percentage of salts (based on water content of the medium being treated) required to inhibit mold. Although calcium propionate is used in the drawing, it will be understood that the effect of other salts and of salts of other acids is similar in inhibition against mold. A large number of tests have shown that the variation in amount of other salts than calcium propionate is not proportionately large, although as higher acid salts are used it has been found that slightly greater quantities of inhibitor are generally preferred to obtain the desired mold inhibition.

The salt may be applied (as a solid or in solution) in any way appropriate to the material treated. If a surface is to be treated, as, for example, the surface of a foodstuff or other material susceptible to mold or the surface of a container or utensil used in the processing or handling of carbohydrates or other food materials or products, it may be sprayed with a solution of inhibitor of the proper concentration and pH value. If the inhibitor is to be incorporated in the processing of a food product such as bread, it may be added to the ingredients before, during, or after the mixing. For example, it may be added as a solution to the batch of bread dough or icing or it may be mixed dry with or sprayed on flours, or meal or cereals. It may be admixed with or sprayed into sweet butter, pastries, custards or confections, cream cheese and cheese spreads. It may be applied to fruits, such as oranges, bananas, pineapples, grapes, apples, pears, by spraying or dipping.

Foods of the above type generally contain or are liable to absorb moisture or water and thus form good culture media for molds. A small quantity of inhibitor provides a salt solution in such moisture sufficient to inhibit the formation of molds. When used to protect materials susceptible to mold, such as fruits, vegetables, tobacco, paper, leather, textiles, wood, belting or the like, or materials utilized in handling food products or other substances which are susceptible to mold, the inhibitors of this invention may be used in solution or dry as desired. One of the advantages of this invention lies in the fact that the inhibitors may be easily shipped, stored or handled, being adaptable to dry or liquid form, i. e. as dry powder or in solution. A further practical advantage of the inhibitors of this invention is that by their use a somewhat greater quantity of water may be utilized, in bread making, thus adding greatly to the freshness and keeping qualities of the final loaf. This is of particular importance in the case of sliced bread.

A typical example is the following in which calcium propionate is incorporated in a bread batch, the bread described being typical of those white breads showing a pH of from about 5.1 to 6.0. In making the bread dough a sponge containing 120 pounds of flour, 82 pounds of water, 3 pounds of yeast and 1 pound of yeast food was made and set at 78° F., to ferment for four and one-quarter hours. It was then made into a dough batch along with the following ingredients:

|  | Pounds |
|---|---|
| Flour | 60 |
| Water | 33 |
| Sugar | 9 |
| Powdered skim milk | 6 |
| Shortening | 5½ |
| Salt | 3⅓ |
| Malt extract | 2 |
| Calcium propionate | ½ |

To these ingredients, there is added, preferably, one ounce of ammonium bicarbonate. It will be understood that the ammonium bicarbonate, or other alkaline material, may be omitted without adverse effect upon the mold resistant qualities of the final bread product. However, as previously set forth, it is preferred to add this material because of the improvement in taste and general quality of the finished bread.

The dough was mixed for 8 to 10 minutes at 80° F., and allowed to ferment ¾ of an hour before making into loaves. The calcium propionate, above specified, was in the ratio of ½ pounds to 115 pounds of water and, therefore, somewhat over 0.4% and amply above that required for a pH value of 5.50 as shown in the accompanying drawing. While the calcium propionate may be added at any stage, it is preferably added to the dough stage. Similarly the magnesium, potassium or sodium propionates, which, together with calcium, are the preferred propionates, may be employed. The calcium salt, however, adds a valuable mineral nutritional constituent to the product and hence is the preferred inhibitor of this invention.

In comparison with bread otherwise identical, but containing no propionate, the bread above described was much more resistant to the growth of mold. When two loaves, one untreated and the other made as above, were inoculated with a mixture containing a variety of mold spores, then wrapped in paraffin paper and placed in an incubator at 96° F., it was found that the untreated loaf contained a vigorous growth of mold after three days, while the bread treated with the propionate developed no visible growth of mold within six days.

When two loaves, both made in a bakeshop under identical normal conditions, one without propionate treatment and the other treated as above, were stored in an incubator, the untreated loaf showed mold growth in three days and was completely covered by mold in ten days, while the treated loaf containing calcium propionate did not develop any signs of mold growth after a period of about ten days.

As previously stated, however, the methods and inhibitors of this invention are applicable for prevention of mold growth in anything susceptible thereto. Thus, for example, samples of cream cheese and a plurality of different cheese spreads and sweet butter were first heavily inoculated with mold, then treated with inhibitor by incorporation therein of 0.3% by weight calcium propionate, based upon the water content of the material treated, and finally placed in a closed vessel which was maintained at room temperature (summer) of 25-30° C., and conditions of 50% and more humidity. At the expiration of a month under these accelerated conditions for mold growth no growth of mold could be seen, whereas samples run as controls but without inhibitor incorporation as above described exhibited mold growth within 48 hours, the controls being under the same conditions of temperature and humidity as inhibited samples.

As an example illustrating the application of this invention by way of spraying the surfaces of the treated materials, similar samples of cream cheese, a number of different cheeese spreads, and sweet butter were first heavily inoculated with mold and then the surfaces of the samples sprayed with a 2% water solution of calcium propionate and thereafter placed in a closed vessel and maintained therein at room temperature (around summer) of 25-30° C., and conditions of 50% and more humidity. The surfaces of the samples were sprayed sufficiently to insure that all the surfaces thereof had been, in effect, covered by the solution of calcium propionate. At the expiration of a month it was found that these samples exhibited no apparent mold growth, whereas controls which were run at the same time and comprising samples indentical with those inhibited but without treatment by spraying as were the inhibited samples, exhibited considerable mold growth under the accelerated conditions of temperature and humidity above described within 48 hours.

In a manner similar to that previously described in connection with cheese and butter, samples of tobacco were likewise treated both by incorporation of approximately 0.3% by weight calcium propionate, based upon the water content of the tobacco, in the finely ground tobacco samples and also by spraying of a 2 and 3% water solution of calcium propionate. These samples of tobacco were placed in a closed vessel along with controls, both the inhibited sample and the control being heavily inoculated with mold spores prior to placement in the closed vessel, and it was found that mold growth was inhibited in the treated sample for periods of over a month, whereas the untreated materials exhibited extensive mold growth in 3 to 4 days. Similarly apples, pears, grapes, oranges and a number of other fruits and vegetables were treated by a spray of a 2% calcium propionate solution, such as described in. the treamtnet of cheese and tobacco, under the same accelerated conditions, and it was found that mold growth upon such fruits and vegetatbles was inhibited for a long period, whereas controls which were not treated by the inhibitor exhibited mold growth within a very few days.

Examples have been given above of the use of calcium propionate both as a spray and for incorporation in the material to be treated although other salts of other acids may similarly be utilized to accomplish the same purpose. Thus, for example, two samples of grape jelly, which is known to be extremely susceptible to mold growth, were treated by heavy inoculation of mold therein. One of the samples thereafter had incorporated in the jelly approximately 0.3% sodium propionate, by weight, based upon the water content of the jelly, and the other sample, although heavily inoculated with mold, was not treated by incorporation of inhibitor therein. These two samples were placed in a closed vessel and maintained at room temperature (summer) of 25-30° C., and conditions of 50% and more humidity. At the expiration of about a month the inhibited sample showed no apparent mold growth, whereas the uninhibited sample showed extreme mold growth within 48 hours. Examples illustrating the use of the inhibitors of this invention could be multiplied extensively, but it is believed that the above cited examples are sufficient to show the scope of the present invention and its applicability to anything susceptible to mold.

Similarly, although concentrations of 0.3% by weight calcium propionate have been described for incorporation, and 2-3% solutions of calcium propionate for spraying, the concentrations in both instances can be materially raised or lowered without detracting from the efficacy of the inhibitor, or resistance of the treated material to mold growth.

Various changes may be made in this invention without departing therefrom or sacrificing any of the advantages thereof.

We claim:

1. The method of inhibiting mold growth in food products susceptible thereto other than margarine and sour dough bread made from non-glutenous flour which comprises adding to such materials from .01% to 2.3% by weight of a salt of a saturated aliphatic mono-carboxylic acid of from 3 to 12 carbon atoms, and from .001% to .3% by weight of an alkaline compound, the proportions of such incorporated substances being based upon the water content of such material treated.

2. The method of inhibiting mold growth in food products susceptible thereto other than margarine and sour dough bread made from non-glutenous flour which comprises adding to such materials from .01% to 2.3% by weight of calcium propionate and ammonium bicarbonate in proportions of $\frac{1}{4}$ to $\frac{1}{10}$ the weight of the propionate, the weight of the propionate being based upon the water content of the material treated.

3. The method of inhibiting mold growth in food products susceptible thereto, other than margarine and sour dough bread made from non-glutenous flour, which comprises adding to such materials from 0.01% to 2.3% by weight of a salt of a saturated aliphatic monocarboxylic acid of from 3 to 12 carbon atoms, based upon the water content of such material, and from 0.001% to 0.3% by weight of ammonium bicarbonate.

CHARLES HOFFMAN.
GASTON DALBY.
THOMAS R. SCHWEITZER.

CERTIFICATE OF CORRECTION.

Patent No. 2,190,714. February 20, 1940.

CHARLES HOFFMAN, ET AL.

It is hereby certified that error appears in the printed specification of the above numbered patent requiring correction as follows: Page 1, second column, line 29, for the word "atoms" read acids; page 3, second column, line 44, claim 1, for "succeptible" read susceptible; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.